United States Patent
Leuthold et al.

(10) Patent No.: US 6,931,212 B2
(45) Date of Patent: Aug. 16, 2005

(54) 3R OPTICAL SIGNAL REGENERATION

(75) Inventors: Juerg Leuthold, Eatontown, NJ (US);
Pierre-Andre Besse, Ecublens (CH)

(73) Assignee: Lucent Technologies Inc., Murray Hill, NJ (US)

( * ) Notice: Subject to any disclaimer, the term of this patent is extended or adjusted under 35 U.S.C. 154(b) by 606 days.

(21) Appl. No.: 09/745,785

(22) Filed: Dec. 22, 2000

(65) Prior Publication Data

US 2002/0080453 A1 Jun. 27, 2002

(51) Int. Cl.⁷ .............................................. H04B 10/02
(52) U.S. Cl. ........................ 398/175; 398/176; 398/155; 398/161; 398/152; 398/154; 359/344; 359/326; 359/237; 359/334; 359/238; 359/332
(58) Field of Search ................................. 398/175, 176, 398/155, 161, 152, 154; 359/344, 326, 237, 334, 238, 332

(56) References Cited

U.S. PATENT DOCUMENTS

| 6,108,125 | A  | * | 8/2000 | Yano ........................... 359/344 |
| 6,229,633 | B1 | * | 5/2001 | Roberts et al. ................. 398/9 |
| 6,437,905 | B1 | * | 8/2002 | Joyner et al. ................ 359/332 |
| 6,515,793 | B2 | * | 2/2003 | Edagawa et al. ........... 359/326 |
| 6,532,091 | B1 | * | 3/2003 | Miyazaki et al. ........... 398/175 |
| 6,608,854 | B1 | * | 8/2003 | Watanabe ..................... 372/96 |
| 2002/0080469 | A1 | * | 6/2002 | Leuthold |

* cited by examiner

*Primary Examiner*—Hanh Phan
(74) *Attorney, Agent, or Firm*—J. J. Brosemer; David Sasso (57) ABSTRACT

A method and apparatus for providing optical 3R regeneration involving: 1) generating an encoded optical clock signal from at least an optical signal; 2) introducing the encoded clock signal into a delay interference section of a regenerator such that an amplitude modulated clock signal is produced; andoutputting the amplitude modulated clock signal wherein the output amplitude modulated clock signal preserves information present within the input optical signal.

8 Claims, 7 Drawing Sheets

3R OPTICAL SIGNAL REGENERATION

FIELD OF THE INVENTION

This invention relates generally to the field of telecommunications and in particular to a method and apparatus for providing wavelength conversion and 3R (re-amplification, re-timing, and re-shaping) optical signal regeneration of optical communications signals.

BACKGROUND OF THE INVENTION

To meet the ever-increasing capacity demand of future optical communications networks, a constant and acceptable optical signal quality must be maintained throughout such networks. In particular, methods and apparatus for providing 3R (re-amplification, re-timing, and re-shaping) optical signal regeneration are required due to dispersion, loss, crosstalk and other non-linearities associated with optical fiber, optical components and optical communications through same.

SUMMARY OF THE INVENTION

I have developed a method and apparatus (3R optical signal regenerator) that provides 3R optical signal regeneration. My method is particularly well suited to provide re-timing and re-shaping and if used in combination with an optical amplifier, it also provides re-amplification. My inventive method and apparatus involves: 1) generating an encoded optical clock signal from at least an optical signal; 2) introducing the encoded clock signal into a delay interference section of the regenerator such that an amplitude modulated clock signal is produced; andoutputting the amplitude modulated clock signal wherein the output amplitude modulated clock signal preserves information present within the input optical signal.

Unlike the prior-art, my inventive method and apparatus permits the development of exceedingly simple, low cost devices.

BRIEF DESCRIPTION OF THE DRAWING

FIG. 4(a)-(f) shows in schematic form, alternative forms of a 3R regenerator according to the present invention;

FIG. 5(a)-(e) shows in schematic form, alternative forms of a delay interference section according to the present invention; and FIG. 6(a)-(b) depicts a simplified embodiment of my inventive 3R regenerator.

DETAILED DESCRIPTION OF THE INVENTION

Figure 1:
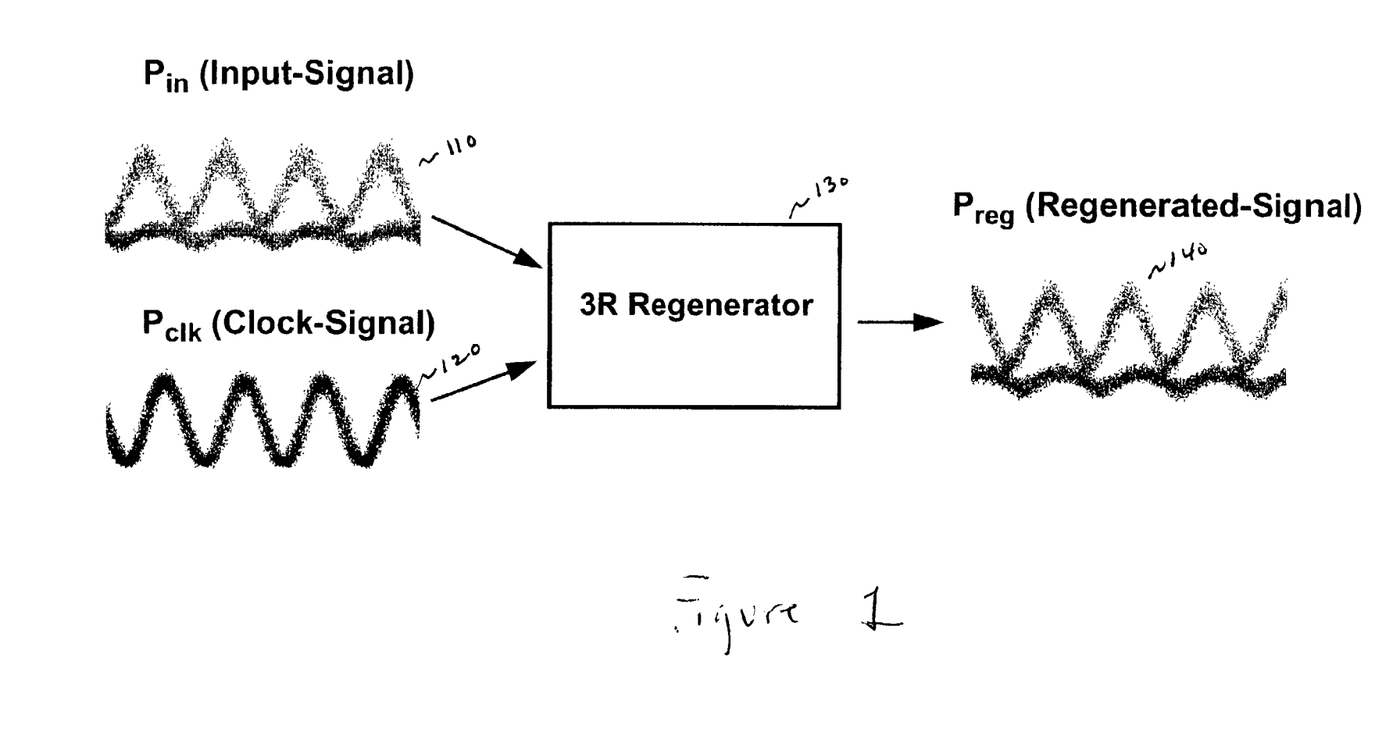
FIG. 1 is a schematic drawing illustrating the broad concept of 3R signal regeneration with simultaneous wavelength conversion according to my inventive teachings.

With reference to FIG. 1, there is shown in schematic form a diagram depicting the broad concept of 3R optical signal regeneration with simultaneous wavelength conversion. Specifically, an input signal ($P_{in}$) 110 is mapped onto a clock signal ($P_{in}$) 120 through the action of 3R regenerator 130 such that regenerated signal ($P_{reg}$) 140 is produced. As can be appreciated, such a concept comprises: reshaping— wherein the regenerated signal 140 exhibits the general shape of the clock signal 120; retiming—wherein the regenerated signal 140 exhibits the general timing of the clock signal 120; and alternatively, reamplification—through the action of amplifiers and by selectively choosing clock signal power. Wherein simultaneous wavelength conversion is accomplished, the clock signal 120 exhibits a new, desired wavelength.

Figure 2:
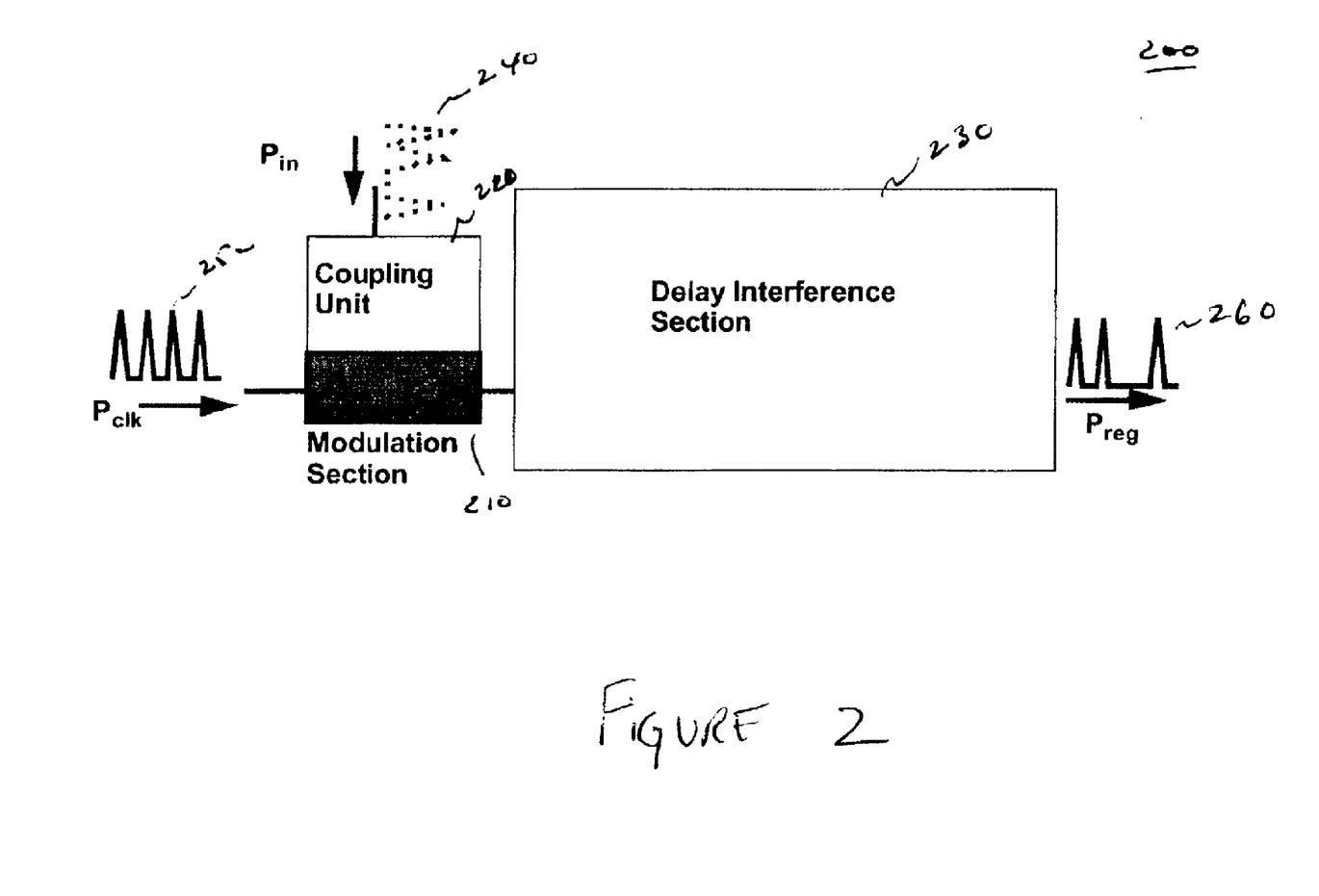
FIG. 2 is a schematic drawing illustrating a generalized 3R signal regenerator according to my inventive teachings.

Turning our attention now to FIG. 2, there is shown a generalized 3R signal regenerator 200 according to the present invention. In particular, the 3R signal regenerator comprises a modulation section 210, a coupling section 220, and a delay-interference section section 230. Accordingly, an input signal ($P_{in}$) 240 in applied to the coupling section 220 and a clock signal ($P_{clk}$) 250 is applied to the modulation section 210 and then provided to the delay interference section 230, the output of which is a regenerated signal ($P_{reg}$) 260 which exhibits the desired characteristics, and in particular, retime, and reshape. Additionally, and as mentioned previously, the regenerated signal 260 may also optionally exhibit a wavelength conversion.

In one embodiment, the modulation section 210 comprises a medium or several different media, that permit transmission of a clock signal ($P_{clk}$) 250 and whose refractive index can be modulated with the input signal ($P_{in}$) 240. Of course, the refractive index may be modulated by means of a nolinear effect (i.e., the refractive index changes in the presence of a strong light signal) by means of a voltage change, a temperature change, or current injection.

As can be appreciated, materials which may be exploited within the modulation section 210 are, e.g., semiconductor optical amplifiers (SOA) comprising, e.g., InGaAsP, InGaAlAs, Ga,As, etc, absorbers, optical fibers, glasses, chalcogenite glasses, semiconductor, plastic based waveguiding materials, liquids or gases.

One implementation based upon an SOA (not explicitly shown in FIG. 2) may operate as follows. An input signal ($P_{in}$) 240 modulates the refractive index of the medium within the SOA by exploiting a refractive-index-related carrier depletion effect. Alternatively, the input signal ($P_{in}$) 240 could be guided into a photodiode resulting in the production of a photocurrent. This photocurrent is then injected into the SOA or is used to vary a voltage over the SOA which in turn changes a carrier density in the SOA resulting in a modulation of the refractive index. In yet another implementation, a Kerr-effect could be exploited to modulate the refractive index in a fiber (not shown) upon the application of an input signal ($P_{in}$) 240. As should be apparent to the reader, many other implementations are easily envisioned.

With continued reference now to FIG. 2, the coupling section 220 directly introduces the input signal ($P_{in}$) 240 into the modulation section 210 or, alternatively, introduces and modifies the input signal ($P_{in}$) 240 such that it may utilized to effect a change in the refractive index of the modulation section 210. In one simple embodiment, the coupling section 220 may comprise an optical coupler, that couples the input signal ($P_{in}$) 240 into a signal path of the clock signal ($P_{clk}$) 250, which subsequently modulates the refractive index of a generally, non-linear material. Such a simple coupler could be placed, for example, before the modulation section 210 or between the modulation section 210 and the delay interference section 230. In another embodiment, the coupling section 220 may comprise an optical circulator positioned between the modulation section 210 and the delay interference section 230. In yet another embodiment, the coupling section 220 may comprise an optical photodiode, which translates the optical input signal ($P_{in}$) 240 into a signal current. This resulting signal current is then introduced into the modulation section 210 where it effects a change in the refractive index.

Continuing with this discussion of FIG. 2, the delay interference section 230 comprises an optical splitter (not shown) an optical combiner (not shown) and multiple optical paths therebetween (not shown). Advantageously, the splitter and the combiner could be the same device. In operation, the delay interference section 230 is used to split the clock signal ($P_{clk}$) 250 into two signals which then propagate for different times along an optical interference path until they are subsequently recombined through the action of the combiner. The combiner, then introduces interference (either constructive or destructive) into the output, ($P_{conv}$) 260 depending upon the relative phase relations between the two, split signals. It may be advantageous, if there is positioned in the optical interference path, a phase-shifter and/or a gain/absorbing section. The time delay $\Delta t$ of the two split signals which results from one of the split signals traversing the optical interference path, is approximately represented by $\Delta t = N \cdot \Delta t_{clk}$, where N=1,2,3 . . ., and where the introduced $\cdot \Delta t_{clk}$ is substantially the time delay between subsequent clock signal pulses.

Figure 3:
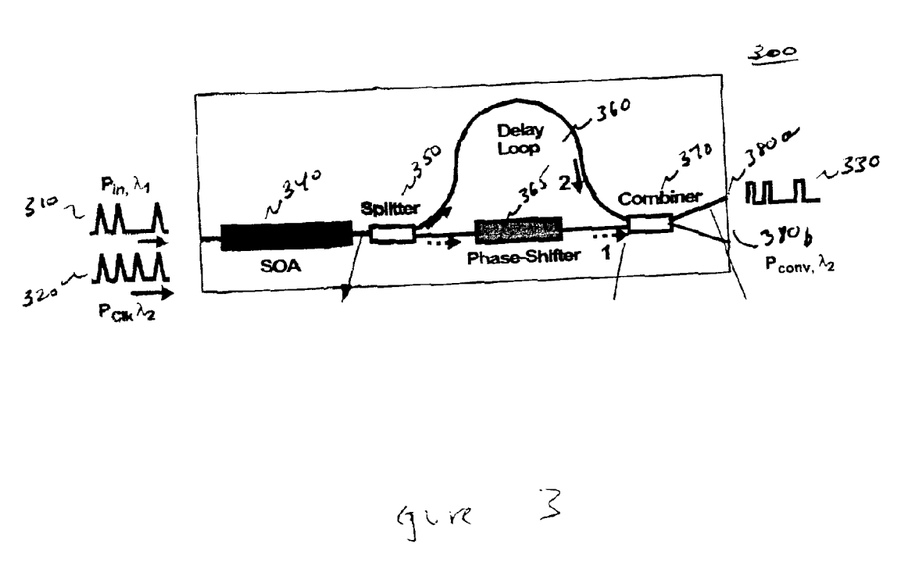
FIG. 3 is a schematic drawing illustrating the operation of a 3R signal regenerator according to the present invention.

Turning our attention now to FIG. 3, there is shown in schematic form a device illustrating the operation of the present invention. In particular, FIG. 3 shows a 3R signal regenerator 300 which accepts as input, input signal $P_{in}$ 310 at $\lambda_1$ and clock signal $P_{clk}$ 320 at $\lambda_2$ and subsequently outputs regenerated signal $P_{conv}$ 330 at $\lambda_2$. In operation, the input signal $P_{in}$ 310 modulates directly or indirectly by one of the aforementioned processes the refractive index of a modulation section (not explicitly shown in FIG. 3) and thereby a phase $\Phi_{cw}$ (not shown) of the clock signal $P_{clk}$ 320. The intensity of the refractive index change is adapted such that it modulates the phase of the clock signal $P_{clk}$ 320 by an amount approximately larger than 0 but not much larger than $+\pi$ or $-\pi$. The rise time of the induced phase shift depends upon the underlying process that is used. Normally, it is almost an instantaneous process, which is limited by the pulse width of the $P_{in}$ 310 signal, whereas the decay of the induced phase is typically slower.

Subsequent to the modulation section, the $P_{clk}$ 320 signal is guided into a delay interference section where it is split and subsequently recombined through the action of splitter 350 and combiner 370, respectively. The split signals traverse at least two separate paths or "arms", one including a delay loop 360 and another including a phase-shifter 365. The phase shifter could be on the other arm as well. A gain or absorbing section could be placed on one or both of the arms.

The clock signal traversing the shorter interferometer path exhibiting the phase shift first reaches the coupler and "opens a switching window" in the non-bit inverting operation mode respectively and closes the switching window in the bit inverted operation mode on the output port 380b. At a time $\Delta t$ later when the clock signal traversing the longer interferometer path, the phase difference is reset and the switching window in the output port 380b closes opens, respectively. If a second input data pulse follows, the switching window is reopened by setting the phase of the clock in the shorter interferometer path again or remains closed respectively. In order to obtain substantial constructive and destructive interference of subsequent clock pulses into the output, it is necessary to choose the delay time $\Delta t$ such that it is substantially the same as the time delay of subsequent clock pulses $\Delta t_{clk}$.

Figure 4:
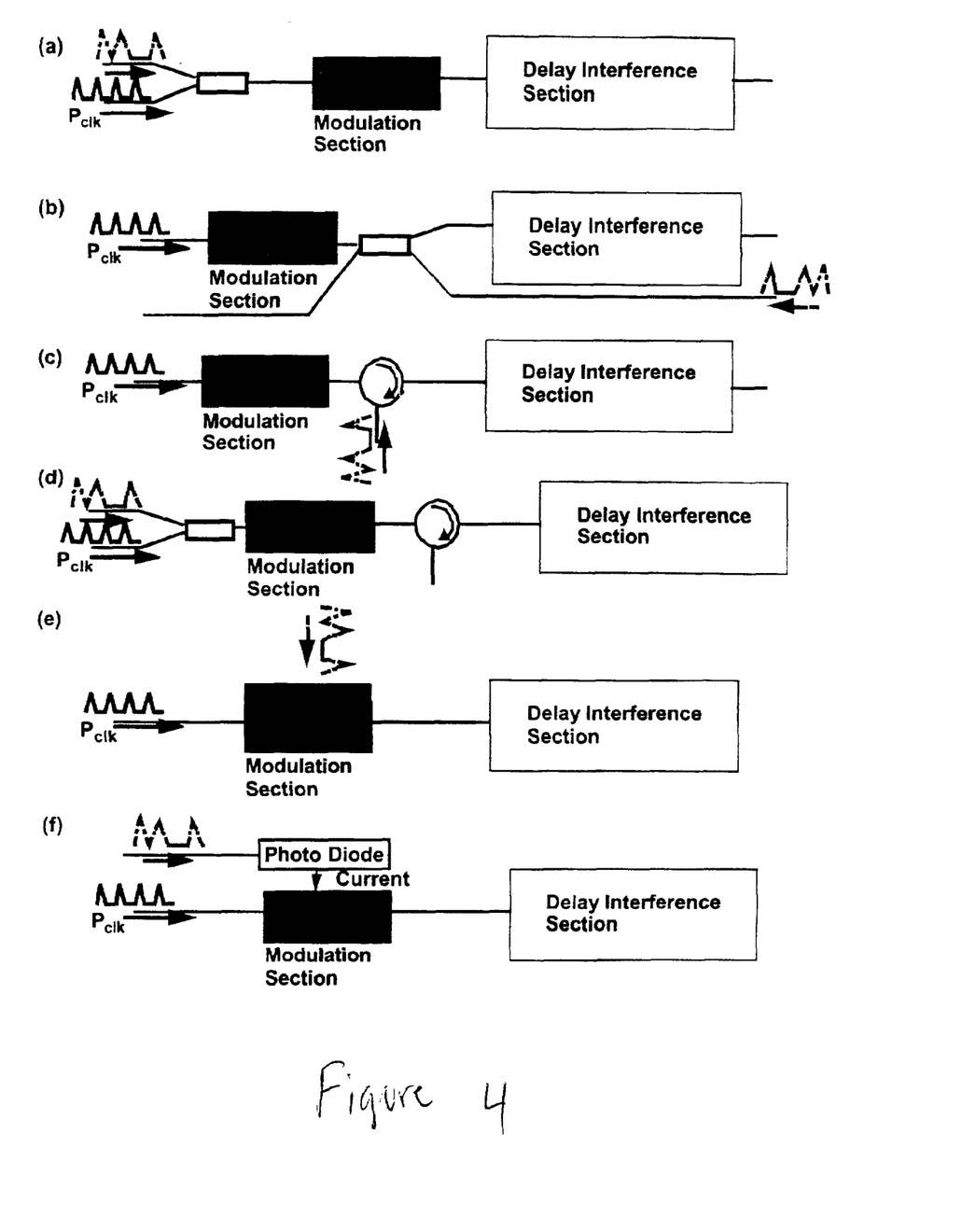

As can be appreciated, there are a variety of ways in which a coupling unit such as that shown in FIG. 2 as reference 220, could be implemented. With reference now to FIG. 4(a)-(f) there is shown such variety of implementation. FIG. 4(a) shows a simple combiner (coupler) 410 positioned before a modulation section 420 and delay interference section 430. It permits coupling of both an input clock signal and input signal into a modulating section in a co-propagating manner.

A filter could be placed between the modulation section and the delay interference section to extract the input-signal, since the input-signal is not needed in the delay interference section. This filter could be a tunable wavelength filter or a special coupler, etc. FIG. 4(b) depicts a coupler 410 positioned between the modulation section 420 and delay interference section 430. An input signal is introduced in a counterpropagating manner. Advantageously, no filter is required to separate the clock from the control signal. Additionally, optical isolators may be utilized at an input side if desired.

FIG. 4(c) includes a circulator 440, positioned between the modulation section 420 and the delay interference section 430. The circulator 440 introduces an input signal into the modulation section 420. The circulator 440 maps a clock signal into the delay interference section 430 without distortions.

FIG. 4(d) includes both an optical coupler 410 and a circulator 440. A clock signal and an input signal are introduced via the optical coupler 410. This configuration assumes that a reflection from the delay interference section 430 is extracted via the circulator 440 which includes a regenerated pulse.

FIG. 4(e) shows my inventive 3R regenerator having a grating 420(a) which introduces an input signal into the modulation section 420. The grating 420(a) may be placed in a fiber or waveguide in front of, or after the modulation section 420.

Finally, FIG. 4(f) includes a photo diode 450 which may be used to detect an input signal and effect a modulation of current (or voltage) of a nonlinear medium. Of course, many other types and variations of these are possible and readily apparent to one skilled in the art.

FIG. 5(a)-(e) shows variations to a delay interference section of my inventive 3R regenerator. As can be readily appreciated, interferometric delay schemes utilize light paths of different length or, alternatively, have different propagation speed for different parts of a light signal. They contain, for example, light splitters and combiners in the form of optical couplers, gratings, mirrors, polarization splitters, higher order mode couplers. The coupler may have, for example, symmetric or asymmetric splitting ratios or even be tunable.

Figure 5:
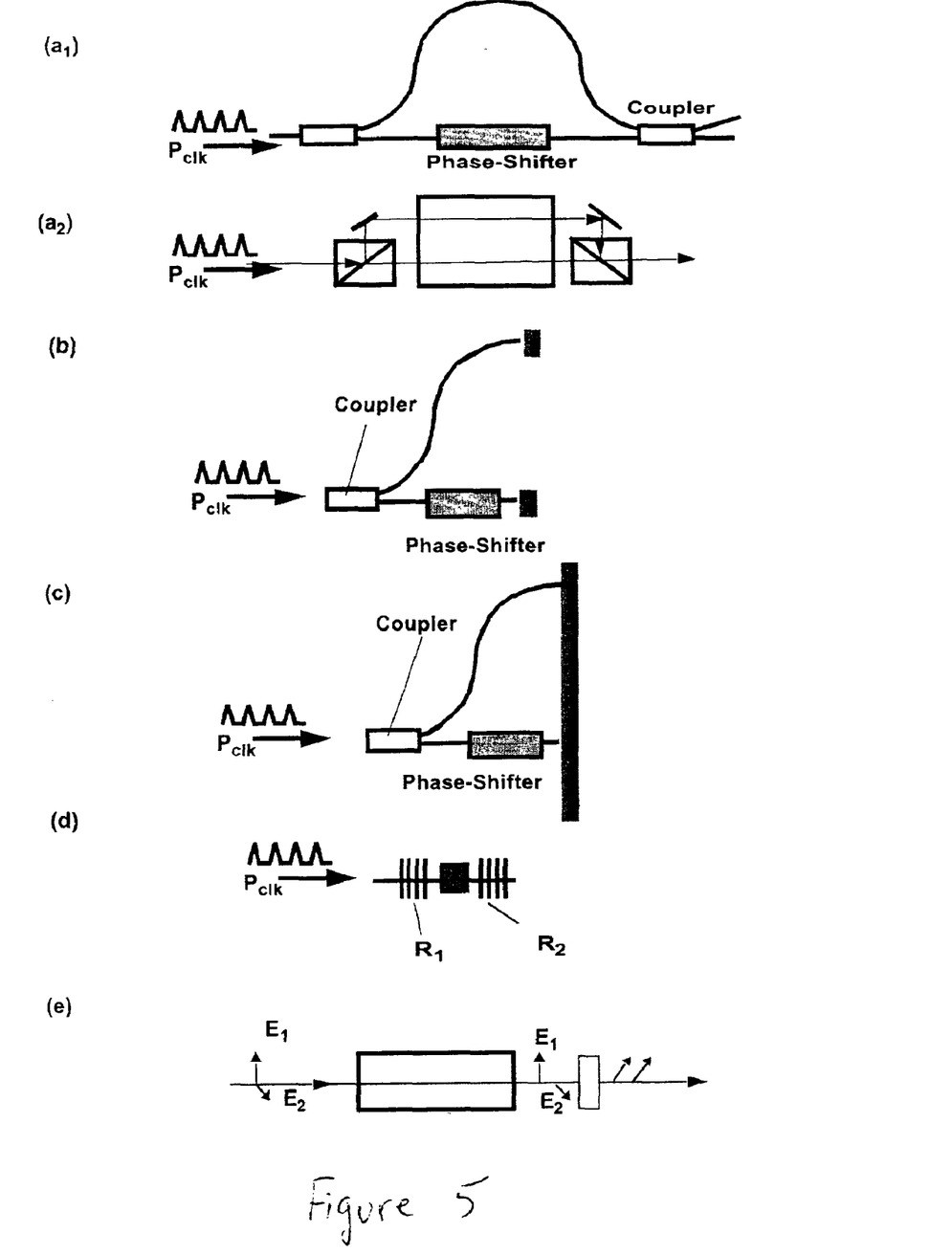

With reference now to FIG. 5(a), an interference section is formed by two couplers and two interference arms of different lengths. FIGS. 5(b) and 5(c) are similar, 5(b) shows an apparatus having 2 different length fibers. In FIG. 5(c), a coupler is followed by two light guiding means. The guiding means are terminated at a reflecting surface such that light is reflected back to the coupler. The lengths of the two light paths is different. In FIG. 5(d), an interferometer is shown, where one part of the light is reflected back at probability R1 and the remaining part of the light is reflected back with a probability R2, a little later. Subsequently, the two backward reflected parts interfere into the output. Finally, in FIG. 5(e), the clock signal is introduced with a certain polarization state into a birefringement crystal or other material. The two signals having different polarization exit the material with a certain delay relative to one another. They are subsequently rotated into the same polarization state and combined, so that they can constructively or destructively interfere.

Figure 6A:
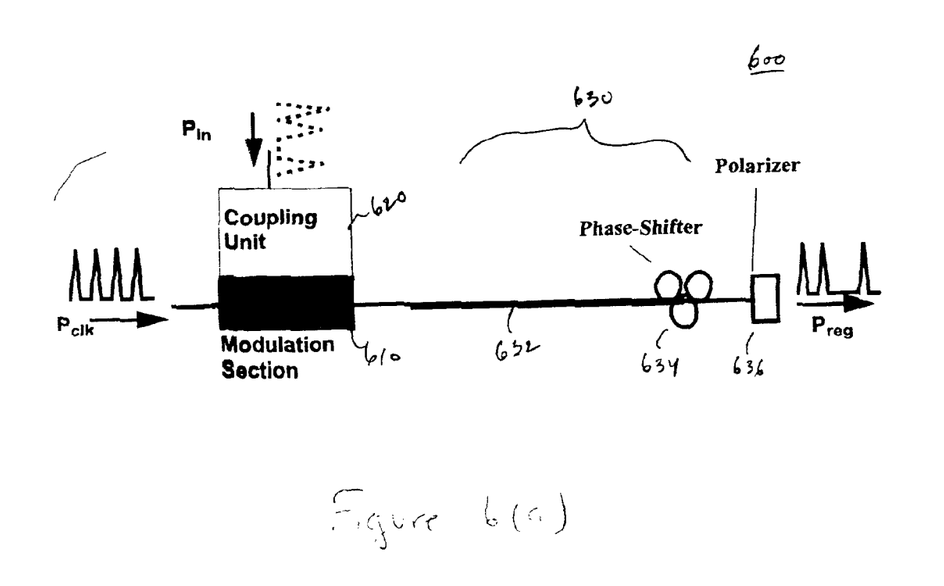

Finally, FIG. 6(a) shows my inventive 3R regenerator implemented with fiber. Specifically, the regenerator 600 includes a modulation section 610, an input signal coupling unit and a delay interference section 630, wherein this delay interference section 630 has a birefringent fiber, a phase shifter 634 and a polarizer, 636. The birefringent fiber 632 could be a polarization mode dispersion fiber that exhibits different group velocity for light of different polarization. The length of the fiber determines the delay between different modes. As can be seen in FIG. 6, at an end of the fiber distal to the modulation section 610, is located a phase shifting element 634. This phase shifter could be a half-wave plate, a polarization controller or another suitable element. Further distal, there is located a polarizer, that is positioned such that approximately one-half of the light which traverses the fiber is coupled into an output.

Figure 6B:
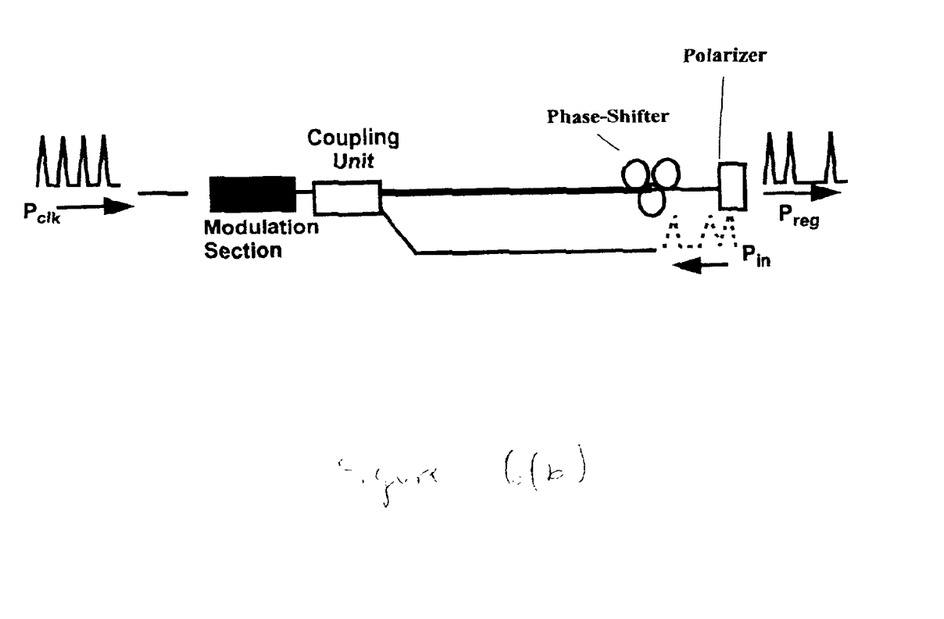

In alternative implementations, additional phase shifters, wave-plates or polarizers may be inserted between the modulation section and the delay section thereby assuring more stable operation. Generally, it is recommended to temperature control the whole unit or part of it to ensure stable operation. An input signal may be coupled into a SOA in counter-propagating operation. An example of such a configuration is shown in FIG. 6(b).

Various additional modifications of this invention will occur to those skilled in the art. Nevertheless, all deviations from the specific teachings of this specification that basically rely upon the principles and their equivalents through which the art has been advanced are properly considered within the scope of the invention as described and claimed.

What is claimed is:

1. A method of optical signal regeneration comprising the steps of:

generating a phase and amplitude encoded clock signal using at least one input optical signal and a clock signal;

introducing the encoded clock signal into a delay interference section of the regenerator such that an amplitude modulated clock signal is produced; and outputting the amplitude modulated clock signal wherein the output amplitude modulated clock signal preserves information present within the input optical signal wherein the use of the clock signal allows retiming of the at least one input optical signal.

2. The method according to claim 1 wherein said delay interference comprises the steps of: N splitting the encoded clock signal into at least two optical signals; and delaying one of the encoded signals by an amount $\Delta t$ from another signal wherein $\Delta t \cong N*\Delta t_{clk}$, where $\Delta t_{clk}$ is a clock pulse time delay measured between subsequent clock signal pulses and N is an integer.

3. The method according to claim 2 further comprising the steps of:

optically amplifying the amplitude modulated clock signal.

4. The method according to claim 2 further comprising the steps of:

polarizing the amplitude modulated clock signal.

5. The method according to claim 2 wherein the delay interference section includes a bi-refringent fiber in optical communication with a phase shifter.

6. The method according to claim 5 wherein the delay interference section further includes a polarizer in optical communication with the phase shifter.

7. The method according to claim 1 wherein the generating step further includes the steps of:

applying the input optical signal to a coupling section of an optical regenerator; and applying the clock signal to a modulation section of the optical regenerator.

8. The method according to claim 7 wherein said coupling section comprises a photodiode.

* * * * *